(12) United States Patent
Kolijn (10) Patent No.: US 11,819,886 B2
(45) Date of Patent: Nov. 21, 2023

(54) NON-CORROSIVE PROCESS FOR CLEANING A RECYCLABLE MATERIAL

(71) Applicant: TUSTI B.V., Eindhoven (NL)

(72) Inventor: Jan Kolijn, Eindhoven (NL)

(73) Assignee: TUSTI B.V., Eindhoven (NL)

( * ) Notice: Subject to any disclaimer, the term of this patent is extended or adjusted under 35 U.S.C. 154(b) by 43 days.

(21) Appl. No.: 17/442,261

(22) PCT Filed: Mar. 16, 2020

(86) PCT No.: PCT/EP2020/057057
§ 371 (c)(1),
(2) Date: Sep. 23, 2021

(87) PCT Pub. No.: WO2020/193247
PCT Pub. Date: Oct. 1, 2020

(65) Prior Publication Data
US 2022/0152664 A1 May 19, 2022

(30) Foreign Application Priority Data
Mar. 27, 2019 (EP) ..................................... 19165582

(51) Int. Cl.
*B08B 3/08* (2006.01)
*B08B 3/04* (2006.01)
(Continued)

(52) U.S. Cl.
CPC .................. *B08B 3/08* (2013.01); *B08B 3/04* (2013.01); *C11D 7/261* (2013.01); *C11D 7/5022* (2013.01);
(Continued)

(58) Field of Classification Search
CPC ......... B08B 3/08; B08B 3/14; B08B 2240/00; C11D 7/261; C11D 7/5022; B29B 2017/0015
See application file for complete search history.

(56) References Cited

U.S. PATENT DOCUMENTS 6,069,182 A * 5/2000 Naber ...................... C08J 11/04
528/495
6,114,401 A 9/2000 Doonan et al.

FOREIGN PATENT DOCUMENTS

| EP | 0611071 A1 | 8/1994 | |
| WO | WO-0194457 A2 * | 12/2001 | ............. C08G 69/04 |
| WO | 2015/150485 A1 | 10/2015 | |

* cited by examiner

*Primary Examiner* — Sharidan Carrillo
(74) *Attorney, Agent, or Firm* — NIXON PEABODY LLP; Ronald I. Eisenstein; Nicole D. Kling (57) ABSTRACT

The invention relates to a non-corrosive process for cleaning a recyclable material comprising the following steps: (a) providing a contaminated recyclable material; (b) treating the contaminated recyclable material at a temperature in the range of from 45-30° C. with a solution that contains one or more polyols to remove contaminants from the contaminated recyclable material, wherein the one or more polyols is (are) present in an amount of at least 15 wt. %, based on the total weight of the solution, thereby forming a liquid 10 mixture which comprises one or more polyols, contaminants removed from the recyclable material, and treated recyclable material; (c) separating at a temperature in the range 10-55° C. at least part of the recyclable material as obtained in step (b) from the liquid mixture as obtained in step (b); (d) allowing at least part of the remaining liquid mixture as obtained in step (c) to phase-1 separate into a polyol phase and a phase which contains contaminants removed from the contaminated recyclable material; (e) recovering the polyol phase as obtained in step (d); (f) recovering the phase which
(Continued)

contains contaminants removed from the recyclable material as obtained in step (d); and 20 (g) recovering the separated recyclable material as obtained in step (c).

2 Claims, 1 Drawing Sheet

(51) Int. Cl.
    *C11D 7/26*     (2006.01)
    *C11D 7/50*     (2006.01)
    *B29B 17/00*     (2006.01)

(52) U.S. Cl.
    CPC ... *B08B 2240/00* (2013.01); *B29B 2017/0015* (2013.01)

NON-CORROSIVE PROCESS FOR CLEANING A RECYCLABLE MATERIAL

CROSS-REFERENCE TO RELATED APPLICATIONS

This application is a 35 U.S.C. § 371 National Phase Entry Application of International Application No. PCT/EP2020/057057 filed Mar. 16, 2020, which designates the U.S. and claims benefit under 35 U.S.C. § 119(a) of EP Application No. 19165582.8 filed Mar. 27, 2019, the contents of which are incorporated herein by reference in their entireties.

FIELD OF THE INVENTION

The present invention relates to a non-corrosive process for cleaning a recyclable material, in particular a plastic material or a clay material.

BACKGROUND OF THE INVENTION

The recycling of materials such as clay materials and plastic materials is becoming increasingly important from both environmental and economical perspective.

A well-known recyclable clay material is bleaching clay which is used in oil refining processes to bleach vegetable and industrial oils. In such bleaching process the colour of the oil which is being processed is lightened. In addition, the bleaching clay will absorb materials such as phosphatides, metal, residual gum, and oxidized products from the oil. During its use the bleaching clay will also become saturated with oil and spent bleaching clay so obtained is considered a waste product. In order to reduce the amount of waste material the spent bleaching clay can be regenerated by recovering oil from the clay and to reuse the regenerated bleaching clay so obtained. A common way to regenerate spent bleaching clay the extraction of oil by means of solvents such as methylethylketone, acetone, petroleum ether and hexane. The disadvantages of such approach are the use of environmentally unfriendly chemicals and the requirement of high temperatures.

Recyclable plastic materials are usually in the form of plastic containers that contain contaminants in the form of residues of the material they once contained. Such residues include for instance detergents, motor oils, milk, frying oils and cooking oils. In order to remove these residues from plastic containers, the plastic containers are usually grinded and the plastic particles so obtained are subjected to a cleaning process. Cleaning processes commonly used for this purpose are energy intensive processes because of the high temperatures that need to be applied and/or are environmentally unfriendly since use is made of combustible or flammable solvents and/or corrosive cleaning agents.

In U.S. Pat. No. 6,114,401, for instance, a plastic reclamation process is described wherein parts of contaminated plastic containers are contacted with a caustic solution having a pH in the range of 11.5 to 12 and containing a very small amount of a de-greaser solvent. Such process has the drawback that the caustic solutions are highly corrosive and that the removal of contaminants leaves much room for improvement.

WO 2015/150485 discloses a process for treating soil and/or sludge polluted by hydrocarbons. In a first step, the contaminated soil and/or sludge is first contacted with an aqueous solution that contains a small amount of polyol, where after in a second step the soil/and/or sludge so obtained is subsequently contacted with an aqueous solution that contains a high amount of hydrogen peroxide. This method has the disadvantages that use is made of environmentally unfriendly hydrogen peroxide, use is made of two different treatment solutions, and the removal of contaminants leaves room for improvement.

Object of the present invention is to provide a non-corrosive cleaning process for recyclable materials which is much more environmentally friendly, simple and which is much less energy intensive.

SUMMARY OF THE INVENTION

It has now been found that this can be established when use is made of a polyol in a non-corrosive process.

Accordingly, the present invention relates to a non-corrosive process for cleaning a recyclable material comprising the following steps:

(a) providing a contaminated recyclable material;
(b) treating the contaminated recyclable material at a temperature in the range of from 45-130° C. with a solution that contains one or more polyols to remove contaminants from the contaminated recyclable material, wherein the one or more polyols is (are) present in an amount of at least 15 wt. %, based on the total weight of the non-corrosive solution, thereby forming a liquid mixture which comprises one or more polyols, contaminants removed from the recyclable material, and treated recyclable material;
(c) separating at a temperature in the range 10-55° C. at least part of the recyclable material as obtained in step (b) from the liquid mixture as obtained in step (b);
(d) allowing at least part of the remaining liquid mixture as obtained in step (c) to phase-separate into a polyol phase and a phase which contains contaminants removed from the contaminated recyclable material;
(e) recovering the polyol phase as obtained in step (d);
(f) recovering the phase which contains contaminants removed from the recyclable material as obtained in step (d); and
(g) recovering the separated recyclable material as obtained in step (c).

An advantage of the present invention resides in the fact that the present process is non-corrosive whilst it establishes a very effective removal of contaminants from the recyclable material, ensuring a highly efficient reuse of the cleaned recyclable material. Moreover, the polyol phase as recovered in step (e) can be recycled to step (b), contributing further to the environmental attractiveness and the economics of the present process.

DETAILED DESCRIPTION OF THE INVENTION

In step (a), a contaminated recyclable material is provided. Preferably, the recyclable material is a recyclable plastic material or a recyclable clay material.

If the recyclable material to be provided in step (a) is a clay material, the clay material is preferably a bleaching clay material. A wide variety of bleaching clay materials can be used in accordance with the present invention. Suitable examples of bleaching clays include clay types such as bentonite, muscovite, montmorillonite, palygorskite, sepiolite and attapulgite and silica based materials such as quartz and mesoporous silica. Suitable examples are bleaching clays with trade names such as Tonsil® 424 or Tonsil® 9192FF (both available from Clariant). The contaminated recyclable bleaching clay materials to be used in accordance with the resent invention will have been used in processes to bleach vegetable oils or industrial oils. The contaminants to be removed from the bleaching clay will correspond to the oil that was bleached in the bleaching process. Suitable examples of vegetable oils include oils such as rapeseed oil, soybean oil, palm oil, mustard oil, castor oil, coconut oil (copra oil), corn oil, cottonseed oil, false flax oil, hemp oil, peanut oil, radish oil, ramtil oil, rice bran oil, safflower oil, sunflower oil, tung oil, algae oil, copaiba oil, honge oil, jatropha oil, jojoba oil, milk bush oil, petroleum nut oil, walnut oil, sunflower oil, dammar oil, linseed oil, poppyseed oil, stillingia oil, vernonia oil, amur cork tree fruit oil, apple seed oil, balanos oil, bladderpod oil, bruceajavanica oil, burdock oil (bur oil), candlenut oil (kukui nut oil), carrot seed oil, chaulmoogra oil, crambe oil, cuphea oil, lemon oil, orange oil, mango oil, mowrah butter, neem oil, rosehip seed oil, sea buckthorn oil, shea butter, snowball seed oil (viburnum oil), tall oil, tamanu oil, and tonka bean oil (cumaru oil). Suitable examples of industrial oils include used lubricating oils such as motor oils. The contaminated recyclable bleaching clay material may contain 15-60 wt. % of the contaminants that need to be removed from the bleaching clay material.

A wide variety of recyclable plastic materials can be cleaned in accordance with the present invention. The recyclable plastic material can suitably be selected from the group consisting of a recyclable polystyrene, high density polyethylene material, low density polyethylene material, polyethylene terephthalate material, polypropylene material, polyvinylchloride material, polyamide material, polybutylene terephthalate material, polycarbonate material, polymethylmethacrylate material, and polyoxymethylene material. Copolymers of any of these recyclable polymer materials can also suitably be used in accordance with the present invention. In addition, the recyclable plastic material to be used in the present invention can also suitably be a laminated polymer composite in which two or more these polymer materials have been laminated onto each other.

Preferably, the recycle plastic material is a recyclable high density polyethylene material or polyethylene terephthalate material.

Suitably, the contaminated recyclable plastic material is derived from consumer product containers. The plastic containers may be containers for consumer products such as food or beverage products, oil products, lubricant products, cosmetic products, or their residues. Suitable examples of food products include sauces, yogurt and mayonnaise. Suitable examples of beverages include lemonades, alcoholic drinks and milk. Suitable examples of oil products are frying oils and cooking oils. Suitable examples for lubricant oils are dielectric oils and motor oils. Suitable examples of cosmetic products include body lotions, sun screen compositions and shampoos.

The contaminated recyclable plastic material will usually be provided in the form of plastic particles that are obtained by shredding or grinding contaminated plastic containers into plastic container parts. The particles may for instance be in the form of flakes. If the particles are in the shape of flakes, the average surface area of the flakes can suitably in the range of from 8-1600 cm$^2$, preferably in the range of from 50-900 cm$^2$.

The contaminated recyclable plastic material to be provided in step (a) can be subjected to a pre-cleaning step. In such a pre-cleaning step undesired materials such as glass, metal and sand can be removed from the contaminated recyclable plastic material before it is provided in step (a).

The process of the present invention is a non-corrosive process for cleaning a recyclable material. The term "non-corrosive" means that in the process the presence of corrosive compounds such a caustic soda and hydrogen peroxide is as much as possible avoided.

Therefore, in step (b) use is made of one or more non-corrosive solutions in which at least one of the non-corrosive solutions contains one or more polyols.

In the context of the present invention "non-corrosive solutions" are defined as solutions that are substantially free from any corrosive compounds such as for example caustic soda and hydrogen peroxide. Suitably, the non-corrosive solutions contain less than 5 wt. % of any corrosive compounds. Preferably, the non-corrosive solutions contain less than 2.5 wt. %, more preferably less than 1 wt. % and even more preferably less than 0.5 wt. % of any corrosive compounds. Most preferably, the non-corrosive solutions are completely free from of any corrosive compounds.

Accordingly, the present invention relates to a non-corrosive process for cleaning a recyclable material comprising the following steps:

(a) providing a contaminated recyclable material;
(b) treating the contaminated recyclable material at a temperature in the range of from 45-130° C. with one or more non-corrosive solutions, wherein at least one of the non-corrosive solutions contains one or more polyols to remove contaminants from the contaminated recyclable material, wherein the one or more polyols is (are) present in an amount of at least 15 wt. %, based on the total weight of the non-corrosive solution, thereby forming a liquid mixture which comprises one or more polyols, contaminants removed from the recyclable material, and treated recyclable material;
(c) separating at a temperature in the range 10-55° C. at least part of the recyclable material as obtained in step (b) from the liquid mixture as obtained in step (b);
(d) allowing at least part of the remaining liquid mixture as obtained in step (c) to phase-separate into a polyol phase and a phase which contains contaminants removed from the contaminated recyclable material;
(e) recovering the polyol phase as obtained in step (d);
(f) recovering the phase which contains contaminants removed from the recyclable material as obtained in step (d); and
(g) recovering the separated recyclable material as obtained in step (c).

Although small amounts of corrosive compounds may be present, it is important that the solution(s) in step (b) maintain their non-corrosive character. Hence, preferably use is made in step (b) of only non-corrosive solutions.

Accordingly, the present invention relates to a non-corrosive process for cleaning a recyclable material comprising the following steps:

(a) providing a contaminated recyclable material;
(b) treating the contaminated recyclable material at a temperature in the range of from 45-130° C. with one or more solutions which solutions are each a non-corrosive solution, wherein at least one of the non-corrosive solutions contains one or more polyols to remove contaminants from the contaminated recyclable material, wherein the one or more polyols is (are) present in an amount of at least 15 wt. %, based on the total weight of the non-corrosive solution, thereby forming a liquid mixture which comprises one or more polyols, contaminants removed from the recyclable material, and treated recyclable material;

(c) separating at a temperature in the range 10-55° C. at least part of the recyclable material as obtained in step (b) from the liquid mixture as obtained in step (b);
(d) allowing at least part of the remaining liquid mixture as obtained in step (c) to phase-separate into a polyol phase and a phase which contains contaminants removed from the contaminated recyclable material;
(e) recovering the polyol phase as obtained in step (d);
(f) recovering the phase which contains contaminants removed from the recyclable material as obtained in step (d); and
(g) recovering the separated recyclable material as obtained in step (c).

The recyclable material is preferably a recyclable clay material.

Hence, the present invention preferably provides a non-corrosive process for cleaning a recyclable clay material comprising the following steps:
(a) providing a contaminated recyclable clay material;
(b) treating the contaminated recyclable clay material at a temperature in the range of from 45-130° C. with a solution that contains one or more polyols to remove contaminants from the contaminated recyclable material, wherein the one or more polyols is (are) present in an amount of at least 15 wt. %, based on the total weight of the non-corrosive solution, thereby forming a liquid mixture which comprises one or more polyols, contaminants removed from the recyclable clay material, and treated recyclable clay material;
(c) separating at a temperature in the range 10-55° C. at least part of the recyclable clay material as obtained in step (b) from the liquid mixture as obtained in step (b);
(d) allowing at least part of the remaining liquid mixture as obtained in step (c) to phase-separate into a polyol phase and a phase which contains contaminants removed from the contaminated recyclable clay material;
(e) recovering the polyol phase as obtained in step (d);
(f) recovering the phase which contains contaminants removed from the recyclable clay material as obtained in step (d); and
(g) recovering the separated recyclable clay material as obtained in step (c).

The recyclable clay material is preferably a bleaching clay material.

The present invention also relates to a non-corrosive process for cleaning a recyclable clay material comprising the following steps:
(a) providing a contaminated recyclable clay material;
(b) treating the contaminated recyclable clay material at a temperature in the range of from 45-130° C. with one or more non-corrosive solutions, wherein at least one of the non-corrosive solutions contains one or more polyols to remove contaminants from the contaminated recyclable clay material, wherein the one or more polyols is (are) present in an amount of at least 15 wt. %, based on the total weight of the non-corrosive solution, thereby forming a liquid mixture which comprises one or more polyols, contaminants removed from the recyclable clay material, and treated recyclable clay material;
(c) separating at a temperature in the range 10-55° C. at least part of the recyclable clay material as obtained in step (b) from the liquid mixture as obtained in step (b);
(d) allowing at least part of the remaining liquid mixture as obtained in step (c) to phase-separate into a polyol phase and a phase which contains contaminants removed from the contaminated recyclable clay material;
(e) recovering the polyol phase as obtained in step (d);
(f) recovering the phase which contains contaminants removed from the recyclable material as obtained in step (d); and
(g) recovering the separated recyclable material as obtained in step (c).

In addition, the present invention relates to a non-corrosive process for cleaning a recyclable clay material comprising the following steps:
(a) providing a contaminated recyclable clay material;
(b) treating the contaminated recyclable clay material at a temperature in the range of from 45-130° C. with one or more solutions which solutions are all non-corrosive solutions, wherein at least one of the non-corrosive solutions contains one or more polyols to remove contaminants from the contaminated recyclable clay material, wherein the one or more polyols is (are) present in an amount of at least 15 wt. %, based on the total weight of the non-corrosive solution, thereby forming a liquid mixture which comprises one or more polyols, contaminants removed from the recyclable clay material, and treated recyclable clay material;
(c) separating at a temperature in the range 10-55° C. at least part of the recyclable clay material as obtained in step (b) from the liquid mixture as obtained in step (b);
(d) allowing at least part of the remaining liquid mixture as obtained in step (c) to phase-separate into a polyol phase and a phase which contains contaminants removed from the contaminated recyclable clay material;
(e) recovering the polyol phase as obtained in step (d);
(f) recovering the phase which contains contaminants removed from the recyclable clay material as obtained in step (d); and
(g) recovering the separated recyclable clay material as obtained in step (c).

As indicated above, the recyclable material to be cleaned can also suitably be a recyclable plastic material.

Therefore, the present invention also relates to a non-corrosive process for cleaning a recyclable plastic material comprising the following steps:
(a) providing a contaminated recyclable plastic material;
(b) treating the contaminated recyclable plastic material at a temperature in the range of from 45-130° C. with one or more non-corrosive solutions, wherein at least one of the non-corrosive solutions contains one or more polyols to remove contaminants from the contaminated recyclable plastic material, wherein the one or more polyols is (are) present in an amount of at least 15 wt. %, based on the total weight of the non-corrosive solution, thereby forming a liquid mixture which comprises one or more polyols, contaminants removed from the recyclable plastic material, and treated recyclable plastic material;
(c) separating at a temperature in the range 10-55° C. at least part of the recyclable plastic material as obtained in step (b) from the liquid mixture as obtained in step (b);
(d) allowing at least part of the remaining liquid mixture as obtained in step (c) to phase-separate into a polyol phase and a phase which contains contaminants removed from the contaminated recyclable plastic material;
(e) recovering the polyol phase as obtained in step (d);
(f) recovering the phase which contains contaminants removed from the recyclable plastic material as obtained in step (d); and
(g) recovering the separated recyclable plastic material as obtained in step (c).

The present invention also relates to a non-corrosive process for cleaning a recyclable plastic material comprising the following steps:
(a) providing a contaminated recyclable plastic material;
(b) treating the contaminated recyclable plastic material at a temperature in the range of from 45-130° C. with one or more solutions which solutions are each a non-corrosive solution, wherein at least one of the non-corrosive solutions contains one or more polyols to remove contaminants from the contaminated recyclable plastic material, wherein the one or more polyols is (are) present in an amount of at least 15 wt. %, based on the total weight of the non-corrosive solution, thereby forming a liquid mixture which comprises one or more polyols, contaminants removed from the recyclable plastic material, and treated recyclable plastic material;
(c) separating at a temperature in the range 10-55° C. at least part of the recyclable plastic material as obtained in step (b) from the liquid mixture as obtained in step (b);
(d) allowing at least part of the remaining liquid mixture as obtained in step (c) to phase-separate into a polyol phase and a phase which contains contaminants removed from the contaminated recyclable plastic material;
(e) recovering the polyol phase as obtained in step (d);
(f) recovering the phase which contains contaminants removed from the recyclable plastic material as obtained in step (d); and
(g) recovering the separated recyclable plastic material as obtained in step (c).

The present invention also relates to a non-corrosive process for cleaning a recyclable material consisting of the following steps:
(a) providing a contaminated recyclable material;
(b) treating the contaminated recyclable material at a temperature in the range of from 45-130° C. with a non-corrosive solution that contains one or more polyols to remove contaminants from the contaminated recyclable material, wherein the one or more polyols is (are) present in an amount of at least 15 wt. %, based on the total weight of the non-corrosive solution, thereby forming a liquid mixture which comprises one or more polyols, contaminants removed from the recyclable material, and treated recyclable material;
(c) separating at a temperature in the range 10-55° C. at least part of the recyclable material as obtained in step (b) from the liquid mixture as obtained in step (b);
(d) allowing at least part of the remaining liquid mixture as obtained in step (c) to phase-separate into a polyol phase and a phase which contains contaminants removed from the contaminated recyclable material;
(e) recovering the polyol phase as obtained in step (d);
(f) recovering the phase which contains contaminants removed from the recyclable material as obtained in step (d); and
(g) recovering the separated recyclable material as obtained in step (c).

The one or more non-corrosive solutions are substantially free from any corrosive compounds such as for example caustic soda and hydrogen peroxide. Suitably, the non-corrosive solutions contain less than 5 wt. % of any corrosive compounds. Preferably, the non-corrosive solutions contain less than 2.5 wt. %, more preferably less than 1 wt. % and even more preferably less than 0.5 wt. % of any corrosive compounds. Most preferably, the non-corrosive solutions are completely free from of any corrosive compounds.

In step (b) the recyclable material is preferably treated with one or two non-corrosive solutions only.

In step (b), the contaminated recyclable material is treated at a temperature in the range of from 45-130° C. with at least one non-corrosive solution containing one or more polyols, thereby forming a liquid mixture which comprises one or more polyols, contaminants removed from the recyclable material, and treated recyclable material. The temperature in step (b) is preferably in the range of from 45-100° C., more preferably in the range of from 50-80° C.

Suitably, step (b) is carried out at atmospheric pressure. In some embodiments step (b) can be carried out under an elevated pressure in the range of from 1-15 bar.

Suitably, in step (b) the contaminated recyclable material can be treated with a non-corrosive solution which is a pure polyol solution that consists of one or more polyols or it can be treated with a non-corrosive solution which is an aqueous solution that contains one or more water soluble polyols. It will be understood that a pure polyol solution consists substantially completely of one or more polyols without the presence of any solvent. Preferably, the non-corrosive solution is a pure polyol solution that consists of one or more polyols or an aqueous solution that consists of one or more polyols and water, preferably distilled water. In case the solution is an aqueous solution that contains one or more water soluble polyols, the one or more polyols (is (are) suitably present in an amount in the range of from 20-99.5 wt. %, preferably in an amount of 40-99.5 wt. %, more preferably in an amount of 50-99.5 wt. %, even more preferably in an amount of 55-99.5 wt. %. and most preferably in an amount of 60-99.5 wt. %, based on total weight of the aqueous solution.

Preferably, in step (b) a single solution is used. This has the advantage that step (b) can be carried out as a single step, avoiding the use of multiple solutions and minimizing the number of treatment steps.

The one or more non-corrosive solutions to be used in step (b) are substantially free from hydrogen peroxide which is a corrosive and oxidizing compound and has the additional disadvantage, which also applies to caustic solutions with a high pH value, that fatty acid are formed from fatty contaminants which are difficult to remove from polyols. Suitably, the non-corrosive solutions contain less than 5 wt. % of hydrogen peroxide. Preferably, the non-corrosive solutions contain less than 2.5 wt. %, more preferably less than 1 wt. % and even more preferably less than 0.5 wt. % of hydrogen peroxide. Most preferably, the non-corrosive solutions are completely free from hydrogen peroxide.

In step (b), the weight ratio of the solution, preferably non-corrosive solution that contains one or more polyols (A) to the contaminated recyclable material (B) is suitably in the range of from 1-10 (A/B), preferably in the range of from 1-3 (A/B).

In case the contaminated recycle material is treated with a pure polyol solution, the weight ratio of the pure polyol solution (P) to the contaminated recyclable material (B) is in the range of from 1-10 (P/B), preferably in the range of from 1-3 (P/B).

The polyol to be used in accordance with the present invention is defined as an organic compound that comprises at least two hydroxyl groups. In accordance with the invention preferably use is made of water soluble polyols. Preferably, the one or more polyols is (are) selected from the group consisting of meso-erythritol, pentaerythritol, xylitol, sorbitol and glycerol. Preferably, at least one of the polyols is xylitol or glycerol. More preferably, at least one of the polyols is glycerol. Most preferably, the non-corrosive solution only contains one type of polyol which is glycerol.

Steps (a) and (b) are suitably be carried out in the same system, for instance a closed vessel or tank.

In step (b), the recyclable material is treated with the non-corrosive solution that contains one or more polyols. Suitably, the vessel or tank can be provided with a mixing system to agitate the contents of the vessel or tank and to establish sufficient contact between the contaminated recyclable material and the non-corrosive solution that contains one or more polyols in step (b). In case the recyclable material is a recyclable plastic material this material will suitably be in the form of shredded or grinded particles. In this way, in step (b) a slurry which comprises plastic particles and the non-corrosive solution that contains one or more polyols will be obtained. In case the recyclable material is a recyclable clay material this material will suitably be in the form of clay particles. In this way, in step (b) a slurry which comprises clay particles and the non-corrosive solution that contains one or more polyols will be obtained.

Step (b) will suitably be carried out for a predetermined length of time. Preferably, step (b) is carried out over a relatively short period of time. Suitably, step (b) is carried out for a period of time in the range of from 15 seconds to 60 minutes, preferably for a period of time in the range of 1-15 minutes, more preferably fora period of time in the range of from between 2-15 minutes, and most preferably for a period of time in the range of from 2-10 minutes.

If desired, step (b) can be carried out in a series of vessel or tanks which are interconnected with each other. In this way, step (b) can be carried out in a number of stages, ensuring that contaminants are sufficiently removed from the recyclable material. It is also possible to carry out step (b) in a batch mode of operation in which separate tanks or vessels are operated one after each other.

In step (b), the non-corrosive solution has suitably a pH value in the range of 6.5-7.5. Preferably, the non-corrosive solution has a pH value of 7.

In step (c), at least part of the recyclable material as obtained in step (b) is separated from the liquid mixture as obtained in step (b). Preferably, substantially all of the recyclable material is removed in step (c) from the liquid mixture. In the context of the present application this means that more than 95% of the recyclable material, and preferably more than 99% of the recyclable material is separated from the liquid mixture in step (c). To establish the separation, the slurry which comprises particles of recycled material and the liquid mixture as obtained in step (b) can suitably be passed to a separation system in which the cleaned recyclable material in the form of particles will be separated from the liquid mixture that contains contaminants. A variety of separation systems can be used in step (c). Suitably, the separation system is a leaf filter press or a chamber filter press (for clays) or cyclones (for plastics). Other suitable separation systems include sink-float tanks.

The separation in step (c) is carried out at a temperature in the range of from 10-55° C., preferably at a temperature in the range of from 15-45° C. Step (c), can suitably be carried out at a variety of pressures. Preferably, step (c) is carried out at atmospheric pressure.

In step (d), at least part of the remaining liquid mixture as obtained in step (c) is allowed to phase-separate into a polyol phase and a phase which contains contaminants removed from the contaminated recyclable material. Preferably, the entire liquid mixture as obtained in step (c) is allowed to phase-separate into a polyol phase and a phase containing the contaminants. Although, the polyol phase may contain some contaminants removed from the contaminated recyclable material, the contaminants will mainly be present in the solvent phase. The phase-separation in step (d) can be established by passing the liquid mixture as obtained in step (c) to a separate vessel in which in the absence of physical mixing the liquid will phase-separate into two liquid layers, i.e. a polyol phase layer and a phase layer which contains contaminants removed from the contaminated recyclable plastic material. Suitably, step (d) is carried out for a period of time in the range of from 1-1200 minutes, preferably for a period of time in the range of from 10-240 minutes, more preferably for a period of time in the range of from 10-120, even more preferably for a period in the range of from 30-120 minutes, and most preferably for a period of time in the range of from 30-60 minutes. Once, phase-separation has been established in step (d), a polyol phase can be recovered in step (e) and a phase which contains contaminants removed from the contaminated recyclable plastic material can be recovered. In step (f).

In step (e), at least part of the polyol phase as obtained in step (d) is recycled to step (b). Preferably, at least 50 wt. % of the polyol phase obtained in step (d) is recycled to step (b). More preferably at least 75 wt. % and more preferably more than 90 wt. % of the polyol phase as obtained in step (d) is recycled to step (b). Suitably, the entire polyol phase as obtained in step (d) can be recycled to step (b). It may be suitable to subject at least part of the polyol phase as obtained in step (d) to a treatment in which contaminants that are present in the polyol phase are removed from the polyol phase before the cleaned polyol phase so obtained is recycled to step (b). The recycling of at least part of the polyol phase in step (e) is attractive from both economic and environmental reasons. A clear advantage of the use of a polyol in the present invention is that the polyol can very effectively be separated from the contaminants that are removed from the recyclable material, and that the polyol after being separated from the contaminants can attractively be recycled to step (b).

In step (f), the phase that contains contaminants is recovered. Suitably, at least part of the phase that contains contaminants can be reused in the oil refining process from which the contaminants originated.

The recyclable material as obtained in step (c) can subsequently be recovered in step (g). The recovered recyclable material can subsequently be subjected to a rinsing step to further remove contaminants that may still be present on the surface of the recyclable material. The recyclable material, either subject or not subjected to a rinsing step, may then be dried and the dried recyclable material so obtained can be recovered, and subsequently be reused. In case the recyclable material is a plastic material it can be used to form new plastic containers for consumer products. The water used for the rinsing can subsequently be combined with the liquid mixture in step (b). In case the recyclable material is a recyclable clay material, once it is recovered it can be rinsed and/or subjected to a thermal treatment in a step (h) to remove remaining bits of contaminants.

Accordingly, the present invention also provides a process for cleaning a recyclable clay material comprising the following steps:

(a) providing a contaminated recyclable clay material;

(b) treating the contaminated recyclable clay material at a temperature in the range of from 45-130° C. with a non-corrosive solution that contains one or more polyols to remove contaminants from the contaminated recyclable material, wherein the one or more polyols is (are) present in an amount of at least 15 wt. %, based on the total weight of the non-corrosive solution, thereby forming a liquid mixture which comprises one or more polyols, contaminants removed from the recyclable clay material, and treated recyclable clay material;

(c) separating at a temperature in the range 10-55° C. at least part of the recyclable clay material as obtained in step (b) from the liquid mixture as obtained in step (b);

(d) allowing at least part of the remaining liquid mixture as obtained in step (c) to phase-separate into a polyol phase and a phase which contains contaminants removed from the contaminated recyclable clay material;

(e) recovering the polyol phase as obtained in step (d);

(f) recovering the phase which contains contaminants removed from the recyclable clay material as obtained in step (d);

(g) recovering the separated recyclable clay material as obtained in step (c); and (h) subjecting at least part of recyclable clay material as recovered in step (g) to a thermal treatment which is carried out at a temperature in the range of from 300-950° C. Preferably, step (h) is carried out at a temperature in the range of from 500-900° C., more preferably at a temperature in the range of from 550-800° C. Preferably, substantially all of the recyclable clay material as recovered in step (g) is subjected to the thermal treatment in step (h).

In accordance with the present invention, a balance is established between the amount of contaminants to be removed from the recycle clay material, the ease to separate contaminants from the polyol phase, and the amount of contaminants and polyol that remain on the clay material and that can act as a fuel in the thermal treatment in step (h). In this way a most efficient process for the removal of contaminants from contaminated recyclable material is established.

An advantage of the above process is that polyol which is still present in recyclable clay material in step (h) will act as a fuel in the thermal treatment, establishing a highly effective removal of remaining contaminants. The recycle clay material is preferably a recyclable bleaching clay material.

In accordance with the present invention the contaminants are suitably in liquid form.

Figure 1:
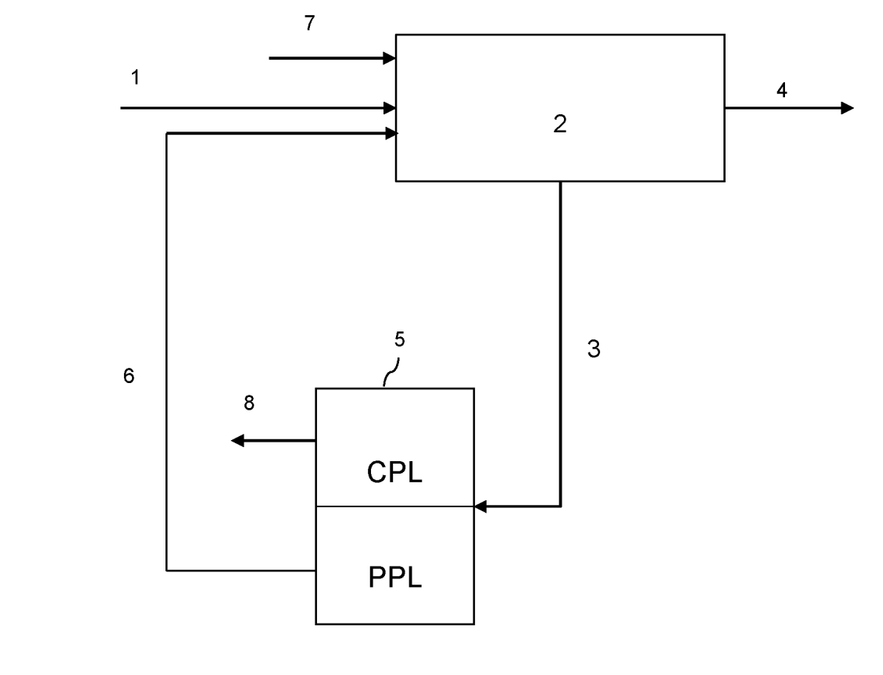
FIG. 1 depicts schematically a process according to the present invention.

In FIG. 1, a stream of contaminated plastic flakes or contaminated clay particles is passed via a line 1 to a cleaning vessel 2 which is operated at ambient temperature and atmospheric pressure. In cleaning vessel 2, a pure polyol solution or an aqueous solution containing one or more water soluble polyols is introduced into vessel 2 by means of line 7. In cleaning vessel 2 the stream of contaminated plastic flakes or contaminated clay particles is contacted under stirring with the pure polyol solution or the aqueous solution to remove contaminants from the plastic flakes or clay particles, thereby forming a liquid mixture of polyol, contaminants and plastic flakes or clay particles. After a predetermined period of time the plastic flakes or clay particles are separated from the liquid mixture for instance by separating means which are not shown in FIG. 1, and the plastic flakes or clay particles from which contaminants have been removed are withdrawn from vessel 2 via a line 4. The liquid mixture which contains contaminants and polyol removed from the plastic flakes or clay particles and which is separated from the plastic flakes or clay particles is withdrawn from vessel 2 via a line 3 and is then introduced in separation vessel 5. In separation vessel 5 the liquid mixture is allowed to phase-separate into a heavier polyol phase liquid (PPL) and a lighter contaminants phase liquid (CPL). At least part of the polyol phase liquid is recycled to cleaning vessel 2 via a line 6, whereas the contaminants phase liquid is withdrawn from separation vessel 5 via a line 8.

EXAMPLES

Example 1 (According to the Invention)

50 g of spent bleaching clay which contained 46% by weight of a mixture of vegetable oils containing palm oil as the major component was mixed with 25 g of glycerol having a pH value of 7 without any corrosive compounds in a 250 ml glass flask. 25 g of water was then added. In this way a liquid mixture was obtained. After mixing for 60 minutes while heating, a temperature of 65° C. was reached. Using a cotton filter cloth in a funnel, the solid fraction of the spent bleaching clay was separated from the liquid phase. After filtering, the remaining liquid mixture was collected and left to phase-separate for 960 minutes (overnight). In this way two phases were obtained: a top layer (smallest amount, clear layer) and a bottom layer (dark layer, higher viscosity). Both phases were analyzed using IR spectroscopy (Perkin-Elmer Frontier IR spectrometer equipped with a U-ATR accessory). The filter cake was collected too and analyzed using thermogravimetric analysis (Perkin-Elmer TGA4000 equipment, in nitrogen atmosphere).

Example 2 (Comparative Example)

This example was carried out in the same manner as Example 1, except that 20 g of spent bleaching clay was used, 100 g of water was used, and no glycerol was used.

Examples 3 (Comparative Example)

This example was carried out in the same manner as Example 2, except that 0.5 g of soda was added to the liquid mixture.

Example 4 (Comparative Example)

This example was carried out in the same manner as Example 2, except that the spent bleaching clay contained 41% by weight of the oil.

Example 5 (Comparative Example)

This example was carried out in the same manner as Example 3, except that the spent bleaching clay contained 41% by weight of the oil.

Example 6 (According to the Invention)

30 kg of glycerol having a pH value of 7 and without any corrosive compounds was preheated to 70° C. in a RVS pan. Then 30 kg of spent bleaching clay which contained 40% by weight of a mixture of vegetable oils containing palm oil as the main component was mixed with the 30 kg of preheated glycerol. After mixing for 15 minutes, a temperature of 55° C. was reached. Using a membrane pump, the mixture was pumped to a membrane-chamber filter press, equipped with a 2 micron polypropylene filter cloth. After filtering, the liquid was collected and left to phase-separate for 960 minutes (overnight). In this way to phases were obtained: a top layer (smallest amount, clear layer) and a bottom layer (dark layer, higher viscosity). Both phases were analyzed using IR spectroscopy (Perkin-Elmer Frontier IR spectrometer equipped with a U-ATR accessory). The filter cake was collected too and analyzed using thermogravimetric analysis (Perkin-Elmer TGA4000 equipment, in nitrogen atmosphere).

Example 7 (According to the Invention)

This example was carried out in the same manner as Example 6, except that the spent bleaching clay contained 45% by weight of the oil.

Example 8 (According to the Invention)

This example was carried out in the same manner as Example 6, except that the spent bleaching clay contained 46% by weight of the oil.

In Table 1, the results are shown of the IR spectroscopy analyses and the thermogravimetric analyses.

Example 9 (According to the Invention)

30 kg of glycerol was preheated to 70° C. in a RVS pan. Then 30 kg of spent bleaching clay which contained 40% by weight of a mixture of vegetable oils containing palm oil as the main component was mixed with the 30 kg of preheated glycerol. After mixing for 15 minutes, a temperature of 55° C. was reached. Using a membrane pump, the mixture was pumped to a membrane-chamber filter press, equipped with a 2 micron polypropylene filter cloth. After filtering, the liquid was collected and left to phase-separate for 960 minutes (overnight). In this way two phases were obtained: a top layer (smallest amount, clear layer) and a bottom layer (dark layer, higher viscosity). Both phases were analyzed using IR spectroscopy (Perkin-Elmer Frontier IR spectrometer equipped with a U-ATR accessory). The filter cake was collected too and analyzed using thermogravimetric analysis (Perkin-Elmer TGA4000 equipment, in nitrogen atmosphere).

The filter cake so obtained was pressed into 6 mm pellets and fed to a 0.5 kW furnace, which was operated at 850° C. In this furnace, a heat exchanger is used to collect the heat from the furnace and use it to deliver hot water. While feeding the pellets during 30 minutes, the temperature remained constant, indicating that the calorific value of the fed material, i.e. the amount of residual organic material on the clay, was sufficient to keep the temperature at its setting point, while delivering hot water and ashes as products. The ashes were collected and analysed: the residual organic content was found to be below 2%.

Example 10 (Comparative Example)

Polypropylene (PP) sheets (thickness 500 micron) were cut into 10 mm×10 mm flakes. 6 grams PP flakes were placed in a 70 mL glass jar. 1 g of fresh frying oil (AH Frituurolie from Albert Heijn supermarket) was added and thoroughly mixed to make sure the entire plastic surface was covered with a layer of fat. In a separate jar, 40 g water and 10 h glycerol (99%, supplied by ABCR GmbH) were mixed. The combined liquids had a pH value of 7 and were held at 20° C., and added to the greasy plastics and shaken gently for 1 minute. After shaking, the liquids were filtered off and the PP flakes were rinsed thoroughly with water having a temperature of 20° C. The wet PP flakes were dried in an oven for 4 hours at 110° C. After drying, the mass of the flakes was determined. The mass before washing (PP and fat) and the total mass after cleaning were used to calculate the remaining amount of oil on the plastic surface and the cleaning efficiency. The equations below were used to calculate these quantities.

$$\text{Remaining amount of oil} = \frac{\text{Mass remaining oil}}{\text{Mass } PP} \times 100\% = \frac{\text{Mass after wash} - \text{Mass } PP}{\text{Mass } PP} \times 100\%$$

$$\text{Cleaning efficiency} = \left(1 - \frac{\text{Mass remaining oil}}{\text{Mass added oil}}\right) \times 100\% = \left(1 - \frac{\text{Mass after washing} - \text{Mass } PP}{\text{Mass added oil}}\right) \times 100\%$$

The cleaning efficiency i.e. the relative amount of oil that was removed in this washing step, was 53%.

Example 11 (According to the Invention)

This example was carried out in the same manner as Example 10, except that the mixture of water and glycerol was heated to 50° C.

The cleaning efficiency i.e. the relative amount of oil that was removed in this washing step, was 85%.

Example 12 (Comparative Example)

This example was carried out in the same manner as Example 11, except that only water was used in the washing step, no glycerol.

The cleaning efficiency i.e. the relative amount of oil that was removed in this washing step, was 48%.

The cleaning efficiency results of Examples 10-12 are shown in Table 2.

TABLE 1

| Example No. | TGA (oil amount before cleaning, wt %) | TGA (oil amount after cleaning, wt %) | TGA (glycerol amount after cleaning, wt %) | IR top phase | IR bottom phase |
|---|---|---|---|---|---|
| Example 1 | 46 | 26 | 20 | triglycerides | glycerol |
| Example 2 | 46 | 44 | 0 | no layer | water |
| Example 3 | 46 | 45 | 0 | no layer | water |
| Example 4 | 41 | 40 | 0 | no layer | water |
| Example 5 | 41 | 39 | 0 | no layer | water |
| Example 6 | 40 | 16 | 40 | triglycerides | glycerol |
| Example 7 | 45 | 20 | 26 | triglycerides | glycerol |
| Example 8 | 46 | 22 | 33 | triglycerides | glycerol |

From Table 1 it is clear that in accordance with the present invention attractive amounts of oil can be recovered from spent bleaching clays using relative low temperatures and an non-corrosive solutions that contains a polyol.

TABLE 2

| Example No. | Oil amount before cleaning (wt. %) | Oil amount after cleaning (wt. %) | Cleaning efficiency (%) |
|---|---|---|---|
| Example 10 | 17 | 8 | 53 |
| Example 11 | 18 | 3 | 85 |
| Example 12 | 17 | 8 | 53 |

Table 2 shows that recyclable plastic material can be efficiently be cleaned using non-corrosive solutions that contain a polyol at a low temperature.

The invention claimed is:

1. A non-corrosive process for cleaning a recyclable clay material comprising the following steps:

(a) providing a contaminated recyclable clay material;

(b) cleaning the contaminated recyclable clay material by treating the contaminated recyclable clay material at a temperature in a range of from 45-130° C. with a non-corrosive solution that contains one or more polyols to remove contaminants from the contaminated recyclable clay material, wherein the one or more polyols is (are) present in an amount of at least 15 wt. %, based on a total weight of the non- corrosive solution, thereby forming a liquid mixture which comprises the one or more polyols, contaminants removed from the recyclable contaminated clay material, and treated recyclable clay material;

(c) separating at a temperature in a range of 10-55° C. at least part of the recyclable clay material as obtained in step (b) from the liquid mixture as obtained in step (b);

(d) allowing at least part of a remaining liquid mixture as obtained in step (c) to phase-separate into a polyol phase and a phase which contains the contaminants removed from the contaminated recyclable clay material;

(e) recovering the polyol phase as obtained in step (d);

(f) recovering the phase which contains the contaminants removed from the contaminated recyclable clay material as obtained in step (d); and (g) recovering the separated recyclable clay material as obtained in step (c).

2. A non-corrosive process for cleaning a recyclable clay material comprising the following steps:

(a) providing a contaminated recyclable clay material;

(b) cleaning the contaminated recyclable clay material by treating the contaminated recyclable clay material at a temperature in a range of from 45-130° C. with a non-corrosive solution that contains one or more polyols to remove contaminants from the contaminated recyclable clay material, wherein the one or more polyols is (are) present in an amount of at least 15 wt. %, based on a total weight of the non-corrosive solution, thereby forming a liquid mixture which comprises the one or more polyols, contaminants removed from the contaminated recyclable clay material, and treated recyclable clay material;

(c) separating at a temperature in a range of 10-55° C. at least part of the recyclable clay material as obtained in step (b) from the liquid mixture as obtained in step (b);

(d) allowing at least part of tahe remaining liquid mixture as obtained in step (c) to phase-separate into a polyol phase and a phase which contains the contaminants removed from the contaminated recyclable clay material;

(e) recovering the polyol phase as obtained in step (d);

(f) recovering the phase which contains the contaminants removed from the contaminated recyclable clay material as obtained in step (d);

(g) recovering the separated recyclable clay material as obtained in step (c); and (h) subjecting at least part of the recyclable clay material as recovered in step (g) to a thermal treatment which is carried out at a temperature in a range of from 300-950° C.

\* \* \* \* \*